Jan. 7, 1930.  C. E. NORTH  1,742,871
MILK PASTEURIZING APPARATUS
Filed Nov. 29, 1926   5 Sheets-Sheet 1

INVENTOR
Chas. E. North
BY
P. F. Bourne
ATTORNEY

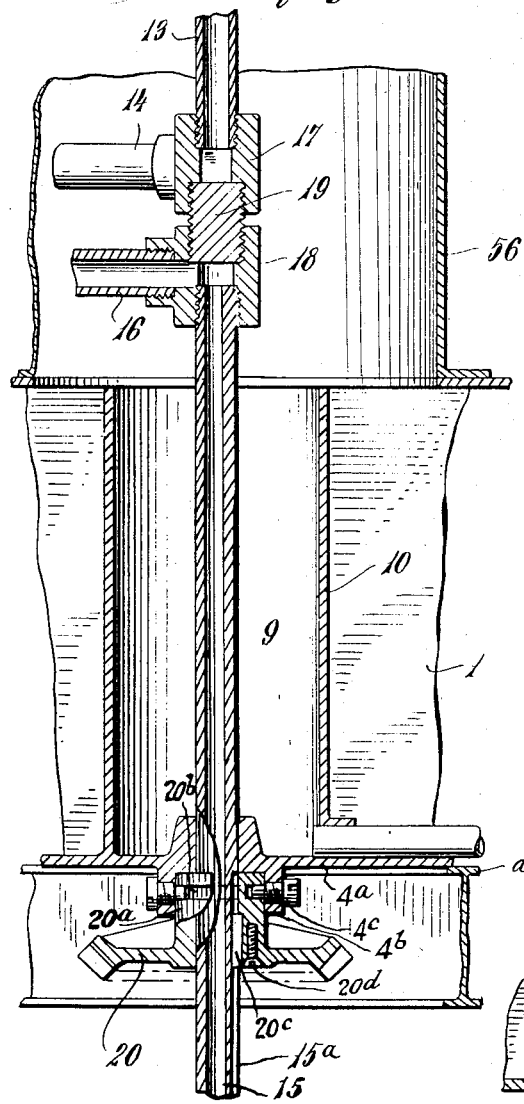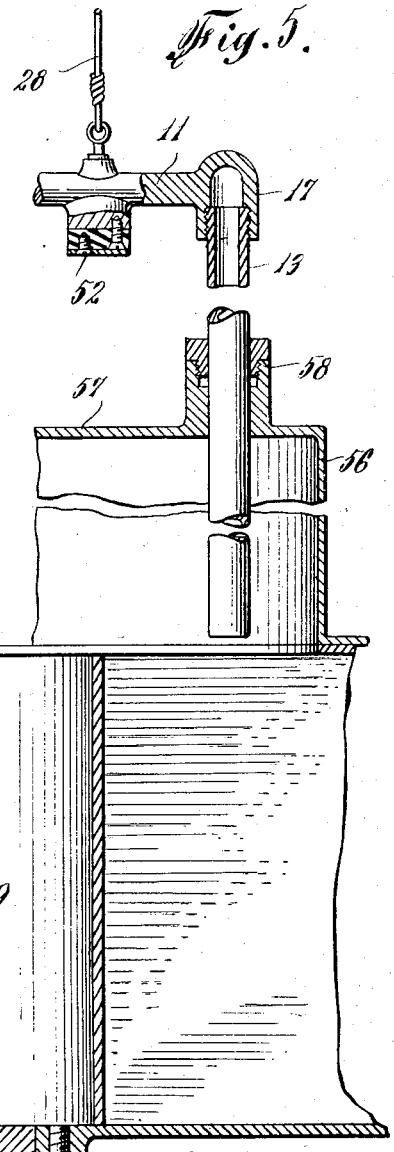

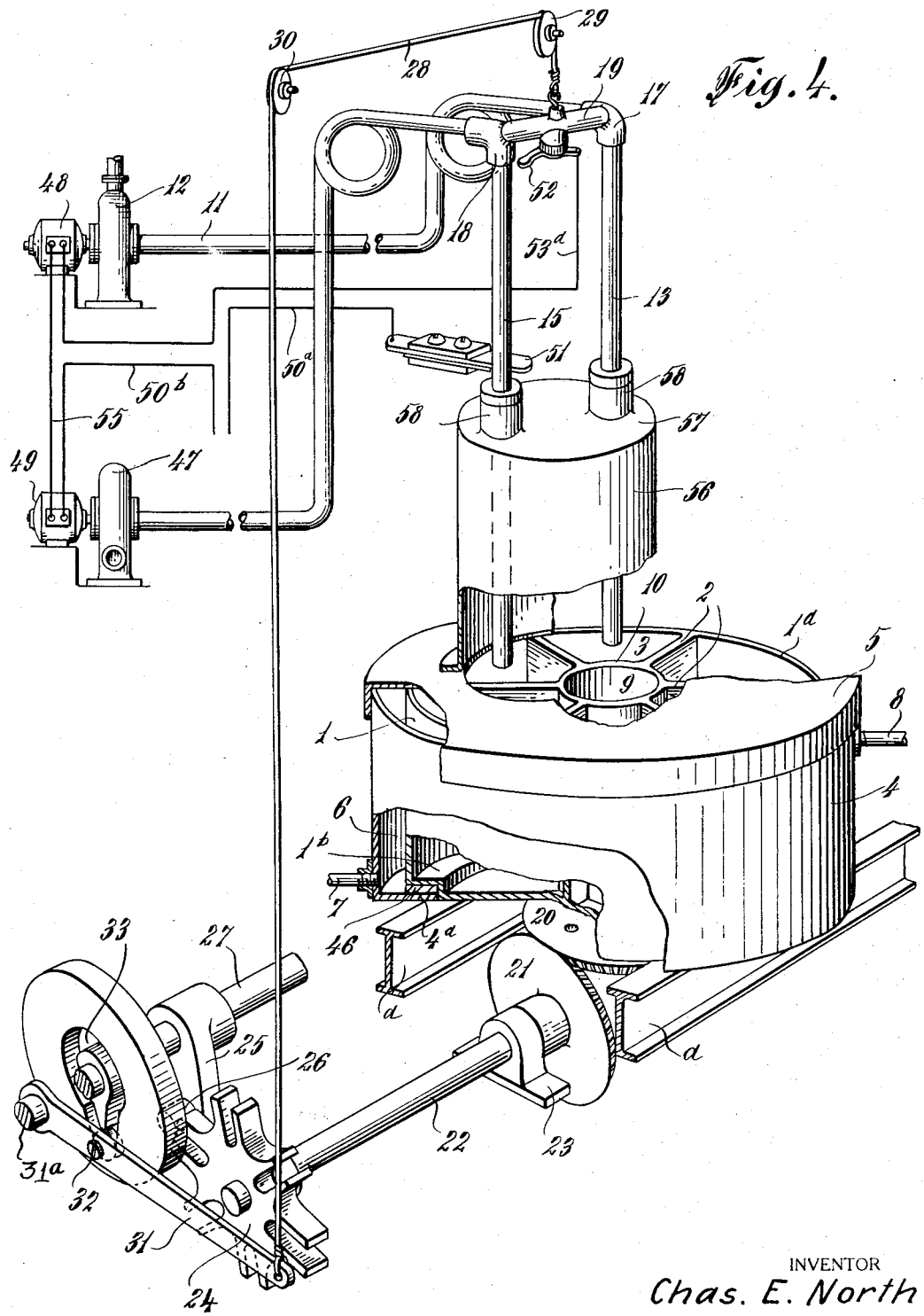

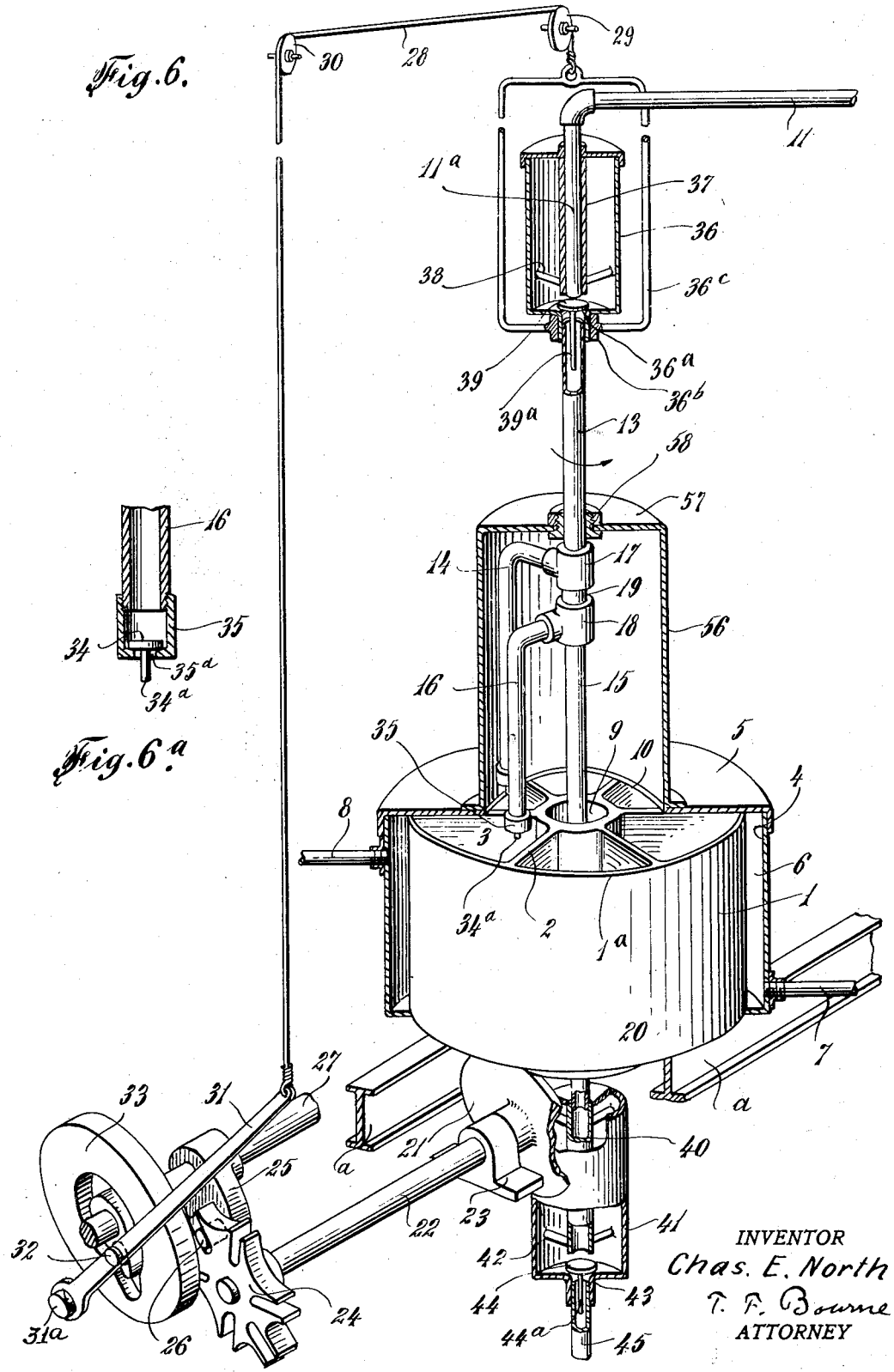

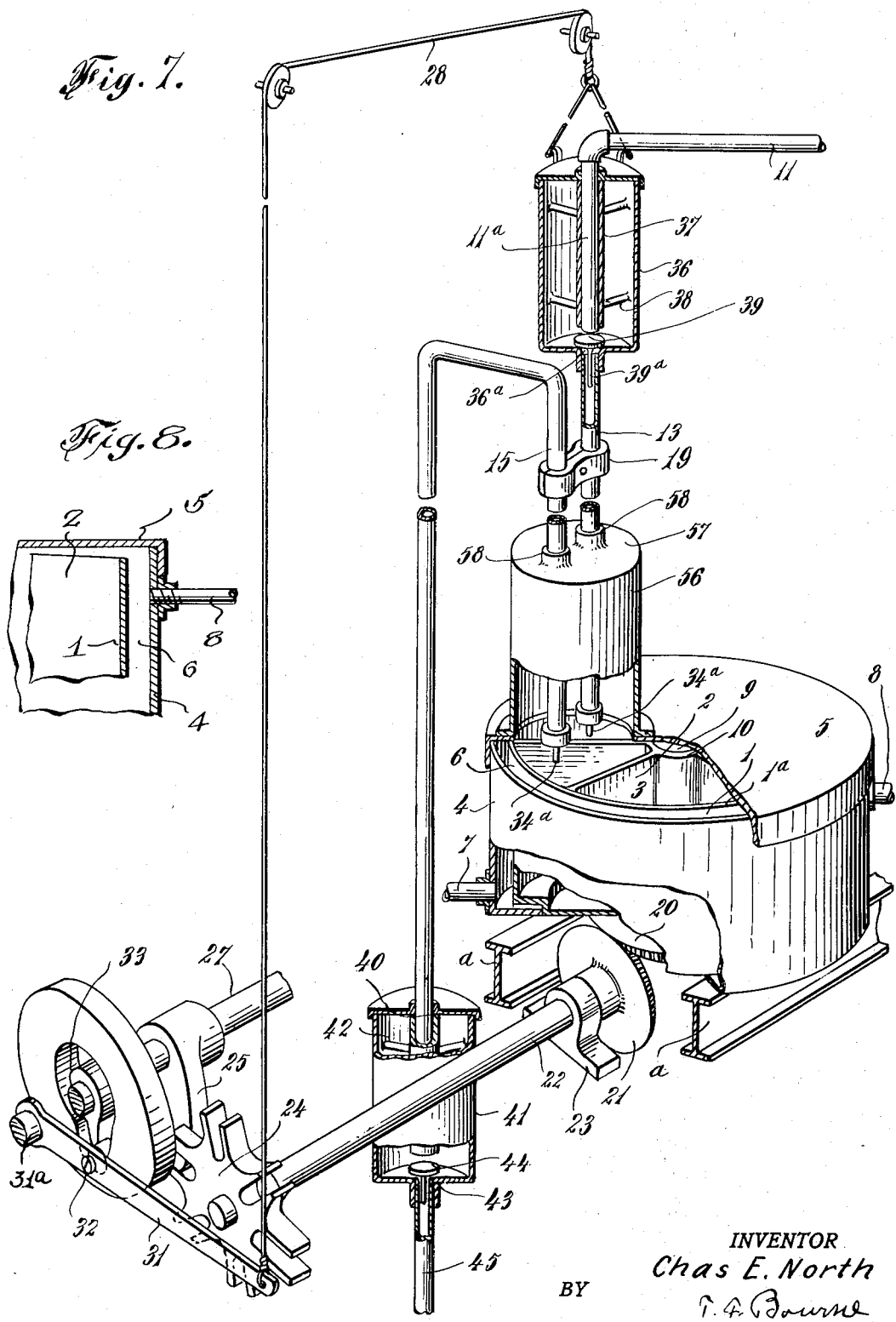

Patented Jan. 7, 1930

1,742,871

UNITED STATES PATENT OFFICE

CHARLES E. NORTH, OF MONTCLAIR, NEW JERSEY, ASSIGNOR TO THE CREAMERY PACKAGE MFG. COMPANY, OF CHICAGO, ILLINOIS, A CORPORATION OF ILLINOIS

MILK-PASTEURIZING APPARATUS

Application filed November 29, 1926. Serial No. 151,362.

In the process of pasteurization of milk the step called "holding" refers to the storage or keeping of heated milk for a definite period of time at a specified temperature. For example, where by law the term "pasteurization" is defined as the heating of milk to a minimum temperature of 142° F. for a minimum time of 30 minutes the time is commonly referred to as the "holding time" and the apparatus in which the milk is contained during that period is called the "holder".

There have been many types of apparatus placed on the market as such "holders", including tanks of cylindrical, square and oblong form, vertical and horizontal in position, single or in series. In some cases milk is first heated by "heaters", and then stored in "holders". In other cases it is both heated and held in the same "holder".

Numerous faults have been found by bacteriologists and engineers with all equipments produced up to this time as known to me. The purpose of the process of pasteurization is the destruction by heat of the germs of disease. These germs are found at times in the raw milk before treatment. After treatment in the "holder" the product should be free from any living disease germs. The purpose of the process is, therefore, defeated if the disease germs are not killed or if after a proper treatment the product is again contaminated by contact with untreated milk.

The objections to all previous equipments may be divided into two classes:

Class I. Failure to kill disease germs because of (a) Loss of temperature during "holding" period.

(b) Loss of time during holding period.

(c) Formation of foam on the surface of milk (which resists heat).

(d) Formation of scum or pellicle on said surface.

(e) Contact of milk with cold air during holding period.

Class II. Contamination of product by contact with untreated milk by (a) Use of the same opening or valve for inlet and outlet of holder.

(b) Leakage or drip of milk into holder from inlet valve or pipe.

(c) Leakage of "unheld" milk into outlet valve or pipe.

(d) Cross-over or short circuit of milk from inlet to outlet.

(e) Dead ends or pockets of untreated or unheated milk.

The bacteriologists have specified the temperature and time necessary to kill disease germs. They also are trained to recognize contaminations and their causes. The engineers have as their function the production of machinery that will fulfill the bacteriologists' specifications. But up to this time such co-operation has not been complete enough to produce any pasteurizing equipment which is free from one or more of the faults in the classes above mentioned.

The object of the invention herein described is to heat and "hold" milk in the process of pasteurization free from any of the faults in the lists of the two classes above mentioned.

The majority of the holding equipments consist of tanks or vats or pockets grouped so as to operate in series. There is commonly a holding period of 30 minutes after any single tank or vat or pocket is filled with milk. In addition to this there is a time allowance for filling and for emptying of "holders". The filling and emptying of "holders" can be made uniform and a part of the operation of a continuous process either by controlling the flow of milk by hand or by an automatic mechanical device. To do this the common practice is to equip each "holder" with an inlet pipe and valve and an outlet pipe and valve. The milk is received into the "holder" through the inlet pipe when the inlet valve is opened either manually or by some mechanical device. The milk flows from the holder through an outlet pipe when the outlet valve is opened in like manner.

Holders of the tank or vat or pocket type are frequently arranged in groups of from 5 to 7 units. In a 7-tank system there will be one tank filling while one tank is emptying and while 5 tanks are full of milk. This system allows a period of 5 minutes for filling each tank, 5 minutes for emptying each tank and 30 minutes for "holding" in each tank. To operate such tanks in this way each tank has commonly attached to it an inlet pipe and valve and an outlet pipe and valve. Thus, in a 7 tank system there are 7 inlet pipes and 7 inlet valves, and 7 outlet pipes and 7 outlet valves, a total of 14 pipes and 14 valves. This multiplication of pipes and valves makes certain the occurrence of leakage and drips that will contaminate the pasteurized milk with unpasteurized milk.

The leakages and drips of unpasteurized milk are due to the fact that pipes and valves have been attached to the tanks in a fixed manner. This permanent attachment provides the means for contaminating the pasteurized milk with unpasteurized milk. Instead of the aforesaid number of inlet pipes and valves attached to the vats I use a single detached inlet pipe which is movable and which operates from vat to vat, dipping itself into and out of each vat and filling each vat in turn. Also, instead of the aforesaid number of outlet pipes and valves attached to the vats I use a single detached and movable outlet pipe which operates from vat to vat and empties each vat in its turn. No control valves in such pipes are required in my method. Leakages and drips from pipes and valves into and from the charged "holders" are entirely eliminated by my invention and consequent contamination avoided.

In accordance with my invention the containers or vats during the holding period are entirely isolated and free from contact with either inlet or outlet pipes and valves. For example, a covered glass lined steel container or tank can be used which is entirely smooth on its inner surface without any openings or connections whatever. There dead ends and pockets cannot exist and no leakages are possible either inward or outward. A lid can be made to cover the top of all the containers or tanks and the supply and discharge or inlet and outlet pipes may be enclosed within an upright cylinder or dome of metal above the cover. These lids or covers can be made detachable and so as to in no way interfere with the movement of the inlet and outlet pipes.

The vertical movements of the inlet and outlet pipes, upward and downward, are provided for by making the connections with the inlet and discharge milk lines either of flexible tubing or of metal piping with movable joints.

The formation of froth or foam on the surface of milk is objectionable because the abundance of air in the bubbles of milk acts as an insulation material which prevents the heating of the mixture to the pasteurizing temperature. Consequently, foam or suds usually have a temperature below the pasteurizing standard and often this is within the zone where conditions are most favorable for the growth and multiplication of bacteria. The presence of foam in the holding tanks may therefore defeat the purpose of pasteurization. The elimination of air from milk prevents the formation of foam. When the pipe line supplying milk to the holders is full of milk without air the milk can be introduced into the holders free from foam unless new foam is created in the very act of filling the holders. This is certain to occur if the milk is discharged from above into the top of the tanks and allowed to splash into the bottom carrying much air into the tanks and into the milk as it is deposited. This splashing of milk into tanks often creates a layer of foam which has a thickness of from 3 to 12 inches on the surface of the milk in such tanks.

In accordance with my invention the formation of foam on the milk is entirely prevented. The milk supply pipe descends vertically until its inlet arm or branch is lowered into the container or tank so far that its lower end is, say, within ¼ inch of the bottom of the container. The inlet pipe is kept filled full of milk from the source of supply by gravity or by a pressure pump. The flow of milk through both the inlet and outlet pipes takes place only when they have been lowered as far as practicable into the containers or tanks. Such flow may be made to start and stop automatically by the operation of the pipes in their vertical movements. Motors operating the milk pumps may be operated by an electric current in such a way that the circuits are closed and opened at the proper times by the descent and ascent of the pipes.

The formation of a pellicle of dried milk or a dry scum on the surface of the milk in the containers or tanks occurs when the air above the surface of the milk is colder than the milk itself or when the air is not saturated with moisture. Such scum or pellicle is not pasteurized as it is cooler than the milk. Many tests have shown that it shelters bacteria and makes impossible an efficient pasteurizing process. This can be prevented by keeping the air in the containers or tanks and within their cover and dome hotter than the body of the milk. This I accomplish by the injection of steam into the top of the container or tank and into the dome or by hot steam pipes fixed to the upper edges of the container and around the inner surface of the dome for heating the contained air by radiation. It is also practicable to blow hot air into the space under the cover and within the dome from an outside hot air supply.

The heating of the air within the dome to a temperature above that of the milk serves another useful purpose. The inlet and outlet branches or arms are intermittently lowered and raised into and out of the tank during the pasteurizing operation. Consequently, the surfaces of the portion of these branches or arms that go below the level of the milk in the tanks are constantly moistened with milk. It is important, therefore, that there should be no contamination of these moist surfaces by outside air and that also their surface should be kept hot enough to prevent any increase in the number of bacteria. The heating of the air in the dome to, for example, 180° F. will effectively accomplish these purposes.

In the accompanying drawings I have illustrated forms of apparatus adapted for carrying out my invention, wherein Fig. 1 is a partly sectional side elevation of a pasteurizing apparatus embodying my invention;

Fig. 3 is an enlarged detail central section through Fig. 1;

Fig. 4 is a partly sectional elevation of a modification;

Fig. 5 is a sectional detail of Fig. 4;

Fig. 6 is a sectional view of a modification;

Fig. 6a is a sectional detail of part of Fig. 6;

Fig. 7 is a sectional detail of a further modification and Fig. 8 is a sectional detail of part of Fig. 1.

Similar numerals of reference indicate corresponding parts in the several views.

Figures 1, 2:
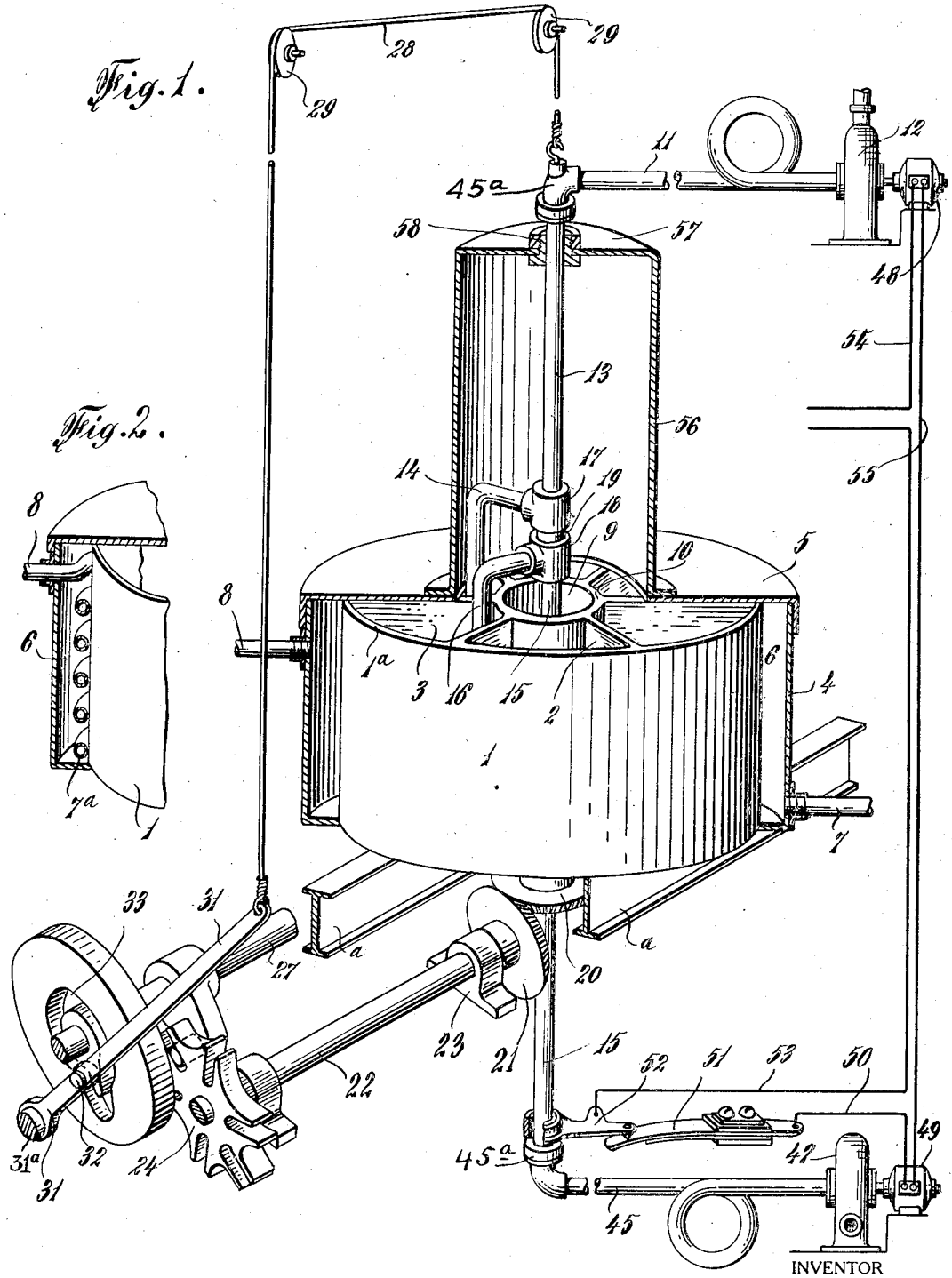
Fig. 2 is a sectional detail of modified means for heating the milk holder.

The numeral 1 indicates a milk holder of the pasteurizer shown comprising an annular shell or casing having radially disposed partitions 2 providing spaced open top containers or tanks 3 annularly disposed. The holder 1 is enclosed within an outer casing 4 spaced therefrom, which is provided with a removable cover 5, whereby the milk holder is tightly enclosed. A space at 6 is provided between the holder 1 and the shell or casing 4 providing means for maintaining the holder at a desired pasteurizing temperature. Free steam may be admitted into the chamber 6 through pipe 7, and at 8 is an outlet pipe for the steam. Such steam may pass over the top of the holder 1 to be above the milk therein. Instead of free steam being provided in the heating chamber 6 the inlet steam pipe may pass through the chamber 6 in the form of a coil at 7a in communication with the steam outlet pipe 8, as illustrated in Fig. 2. The holder and casing 4 may be supported in any desired way as upon beams a. The hot pipe in chamber 6 heats the air by radiation and conduction over the milk in the holder 1. The holder 1 is provided with a centrally disposed cylindrical chamber 9, shown formed by an annular wall 10 from which the walls 2 radiate to the outer wall 1a of the holder. At 11 is a supply pipe for the milk through which the milk may be forced by pressure from a pump 12, as indicated in Figs. 1 and 4, or the milk may flow by gravity from an elevated tank, (not shown), in the form shown in Figs. 6 and 7. A pipe 13 receives the milk from pipe 11 and delivers the milk through a branch pipe 14 into the compartments or tanks 3 of the holder in a successive manner, as illustrated in Figs. 1 and 6, where the pipe 13 is concentrically disposed with respect to the vertical axis of milk holder 1, or the pipe 13 may deliver the milk directly into the holder where the pipe 13 is disposed eccentrically with respect to the holder, as in Figs. 4 and 7. The milk may be heated to desired pasteurizing temperature in any suitable heater before passing through the pipes 11 and 13 to holder 1. An outlet pipe 15 for the milk from the holder, which pipe is not in communication with the supply piping, is shown provided in Figs. 1 and 6 with a branch pipe 16 to dip into the containers in the holder when the pipe 15 is concentric with the axis of the holder, and in the form shown in Figs. 4 and 7 the outlet pipe 15 is eccentrically disposed with respect to the holder to enter the containers or tanks 3. Pipes 13 and 15, and the branch pipes when used, are adapted to be raised and lowered with respect to the holder. The pipes 13 and 15 are shown provided with fittings, such as T's or elbows 17, 18, and an interposed imperforate connector 19, in Figs. 1, 3 and 6, whereby such piping will operate together as a unit. Relative motion is provided between the milk delivery and outlet pipes and the holder whereby the pipes will enter and recede from the compartments of the holder successively.

In the form shown in Figs. 1, 3 and 6 the pipes 13 and 15 are rotative respecting the milk holder 1 in a successive manner to step their branches 14 and 16 successively respecting the containers or tanks 3 and are brought to rest periodically, whereby the branches are lowered into and lifted from the containers or tanks for each charge of milk to be deposited for pasteurization and for each pasteurized charge to be discharged from the holder. In the example illustrated the pipe 15 is provided with a gear 20 in mesh with a gear 21 secured on a shaft 22 which may be journaled in any suitable way, as in a bearing 23. As shown in detail in Fig. 3, the gear 20 comprises a hub portion 20a which extends upwardly within an annular collar or flange 4b depending from the lower surface of the bottom wall 4a of the casing 4. This hub portion 20a is annularly grooved as indicated at 20b, and reduced-diameter portions of screws 4c extend into such groove. The screws 4c are inserted in screw-threaded openings therefor in the depending flange portion 4b of the bottom wall of the casing 4. In this manner the gear 20 is secured against vertical movement with respect to the casing 4, which is stationary, but is permitted to rotate about its vertical axis with the walls of the groove 20ᵇ passing freely by the reduced-diameter portions of the screws 4ᶜ. In order to cause the pipes 15 and 13 and the parts that are secured thereto to rotate with the gear 20, but to permit said pipes and associated parts to move vertically while the gear 20 is immovable vertically, the bore of the hub portion 20ᵃ of said gear is slotted longitudinally to form a key-way for receiving a key 20ᶜ. The outside of the pipe 15 is likewise slotted to form a key-way 15ᵃ, which is of sufficient length to accommodate the full range of movement of the vertically movable parts, and which is of the proper width and depth to receive, in freely slidable relation, the portion of the key 20ᶜ which projects inwardly from the bore of the gear hub portion 20ᵃ. The key 20ᶜ is fixed against vertical displacement with respect to the gear 20 by a machine screw 20ᵈ which is screwed into a properly located and threaded hole in the bottom of said gear so that the head of said screw engages a beveled corner of said key, as shown. With this construction, the key 20ᶜ may be inserted and removed while the pipe 15 is in place within the gear 20, simply by removing the screw 20ᵈ.

Figs. 1 and 6 illustrate means for rotating the pipes 13 and 15 step by step in timed relation to the pasteurization period, such means comprising a member 24 of a Geneva movement secured upon shaft 22, an arm 25 having a pin or projection 26 being adapted to actuate the member 23 in a well known way. Arm 25 is secured upon shaft 27 which may be supported and rotated in any desired manner, such as continuously, by a suitable prime mover, such as an electric motor. Means are provided for raising and lowering the pipes 13 and 15, with their branches 14 and 16 when the latter are used, said pipes being shown supported by a flexible connection, such as a rope 28, passing over idle pulleys 29 and 30 supported in any desired way, which rope is shown attached to an arm 31 which may be journaled upon shaft 31ᵃ and is provided with a projection or pin 32 cooperative with a cam 33 secured on shaft 27. The timing is such, with reference to Figs. 1 and 6, that when the pipes are lowered the branches 14 and 16 will descend into adjacent containers or tanks of holder 1, preferably near to the bottom thereof, and thereupon milk will flow through pipe 13 and branch 14 into one of the tanks and pasteurized milk will flow out of the adjacent tank through branch 16 and thence into the outlet pipe 15.

In the form shown in Figs. 4 and 7 pipes 13 and 15 are raised and lowered but do not rotate. In these forms the holder 1 is rotative clockwise as illustrated, and since the pipes 13 and 15 are located eccentrically with respect to the axis of the holder said pipes may be lowered into and raised from the containers or tanks of the holder in proper timing periods. In this form of apparatus the holder 1 is shown provided with an annular bearing 1ᵇ at its bottom rotatively guided upon a suitable gasket or wear piece 46, shown supported upon the bottom 4ᵃ of casing 4, (Fig. 4), for axially guiding the holder. The gear 20 is secured to the bottom of the holder as shown in Fig. 5 and is driven by the gear 21 and the Geneva movement for rotating the holder 1 step by step, in the manner described with respect to rotating the pipes 13 and 15, in proper timing for the purpose previously set forth. The rope 28 is attached to pipe 15 for raising and lowering the latter as well as the pipe 15 to cause the appropriate pipes to enter and recede from separate containers, and the branch pipes 14 and 16, when used.

As shown in Figs. 1 and 4 the pipe 11 is of the flexible variety, such as a flexible hose, connected with milk supply pump 12, and the drain pipe 45 is also of the flexible variety connected to a milk discharge pump 47. In Figs. 1 and 3 the pipes 11 and 13 and the pipes 15 and 45 are connected by a packed swivel joint 45ᵃ to permit rotation of pipes 13 and 15. The pumps 12 and 47 are to be started and stopped coincidently with the descent of the pipes 13 and 15 and the rising of the same from the holding tank with the branches 14 and 16 when used. Any suitable means may be provided for controlling the operation of the pumps. I have illustrated an electric motor 48 coupled to the drive shaft of pump 12, and an electric motor 49 connected with the drive-shaft of discharge pump 47, said motors being included in series in an electrical circuit. In the form shown in Fig. 1 one branch 50 of the circuit is provided with a spring contact 51 adapted to be engaged by a contact 52 that is shown secured to and insulated from pipe 15, the branch 53 of the circuit being connected with the contact 52, the other branch 54 of the circuit being shown connected to motor 48, branch 55 connecting said motors. The branches 53 and 54 are adapted to be connected with a source of electric current in any desired way. In the form shown in Fig. 4 the contact 51 is maintained in position to be engaged by the contact 52 that is shown carried by the part 19 and is insulated therefrom. The branch 53ᵃ from contact 52 is shown connected with motor 48, and the branch 50ᵃ from contact 51 is adapted to be connected to the source of power, while branch 50ᵇ is connected with motor 49 and adapted for connection with the source of power. The arrangement is such that each time that the pipes 13 and 15 are lowered to supply one compartment or tank 3 with milk and discharge pasteurized milk from another the circuit will be closed at 51 and 52, as illustrated in Fig. 1, whereupon the pumps 12 and 47 will be operated to cause charge of one tank and discharge of the other. As soon as said tanks have been respectively charged and discharged the pipes 13 and 15 will rise and thereupon the electric circuit will be broken to cause the pumps to cease operating during the change of position of the pipes and holder relatively to one another.

As shown in Figs. 6 and 7 means are provided whereby the milk will flow through branch 16 and pipe 15 by means of siphonic action, the arrangement for such purpose being shown as follows: at the ends of branches 14 and 16 in Fig. 6 and at the ends of the pipes 13 and 15 in Fig. 7, are respectively located valve 34 having a stem 34ª depending from the pipe in position to engage the bottom of the holder 1, fitting 35 being located at the end of the pipe and having an outlet opening 35ª controlled by the valve, (Fig. 6ª). The valves act, when upon their seats at the bottoms of the fittings 35, to retain milk in the branches or the pipes, and when the valves are lifted by contact with the bottom of the holder upon the descent of the pipes therein, the flow of milk can occur. A milk supply cylinder above the holder is indicated at 36, (Figs. 6 and 7), which is attached to pipe 13 so as to be raised and lowered therewith, the rope 28 supporting said cylinder. Within the cylinder is a tube 37, secured to the walls of the cylinder as by arms 38, and the lower end of said tube is spaced a short distance above the bottom of the cylinder. The depending portion 11ª of supply pipe 11 is within the tube 37 whereby the latter is guided and the lower end of the portion 11ª of the supply pipe is close to the bottom of cylinder 36 when the latter is raised, whereby the milk from the supply pipe will flow through tube 37 into the cylinder. A float valve at 39 is fitted against the seat at the outlet 36ª at the bottom of cylinder 36, the stem 39ª of said valve being guided within the pipe 13. Float 39 is of such a character as to float in milk and will close against seat 36ª to prevent the entrance of air into pipe 13. The connection between cylinder 36 and pipe 13, in Fig. 6, is such that said cylinder and pipe will rotate together, as by being joined together, the cylinder being supported on a suitable bushing 36ᵇ, supported by a frame 36ᶜ carried by rope 28. The lower end of pipe 15 is slidable in a tube 40 secured in a cylinder 41 by arms 42, that is located below the holder and is suitably secured. The lower end of tube 40 is at a short distance above the bottom of cylinder 41 and the outlet 43 of said cylinder is controlled by a float valve 44 whose stem 44ª is guided in a milk discharge tube 45.

The pipe 15 and its branch 16, when the latter is used, are charged with milk which is retained by the weight of the milk upon the corresponding valve 34. One of the containers or tanks 3 will be charged with milk and then the pipes will be lowered so that the pipe 15 and its inlet end or its branch 16 will be lowered into said milk and a supply of milk will be charged into the adjacent tank 3. The pipes will remain in this position during the filling and emptying period, pasteurization meanwhile occurring in the other compartments.

When a charge in a tank 3 has been pasteurized the pipes will again be lowered and thereupon the valve 34 of pipe 15 or its branch 16 will be raised by contact of its stem with the bottom of the holder and the milk will be siphoned off through drain pipe 45, the milk flowing into the cylinder 41 from pipe 15 and being distributed therein near its bottom in such a way as not to foam, and upon the descent of such pipes the valve 35 of the supply pipe 13, or its branch 14, by engaging the bottom of the holder, will permit a supply of milk to flow into the tank 3 that is adjacent to or in advance of the milk outlet pipe 15. Each time that a tank 3 has been emptied of pasteurized milk and another tank charged with milk to be pasteurized the piping referred to will be raised from the tanks and rotated a step, counterclockwise as illustrated in Fig. 6, so that the outlet 15 or its branch 16 at the next descent will enter a tank containing pasteurized milk to be emptied, and the pipe 13 or its branch 14 will enter a tank previously emptied. Since there are several containers 3 arranged in annular series the period of holding milk from the time it is charged into an empty tank until it is discharged will be such that the milk will be held under the pasteurization temperature for the desired period of time.

It will be understood that the milk in each compartment of the holder is maintained at a desired pasteurization temperature, say, 142° F. for a required period of time, say, thirty minutes. In other words, the operation of the Geneva movement and the lever 31 is such that pipes 13 and 15 with their branches will be lowered and retained in their lowered positions for the time required, for example about five minutes, and then will be quickly raised and rotated a step to be transferred to another set of compartments, or the holder will be rotated a step relatively to the pipes, and so on. During the time that the pipes are lowered milk will flow from pipe 13 into one of the tanks, and simultaneously milk will be discharged from another tank through the branch 16 and pipe 15.

In order to prevent contamination of the milk and to keep the parts of pipes 13 and 15, or the branch pipes 14 and 16, that contact with milk in the holder out of contact with atmospheric air and other deleterious substances I provide dome 56 that is secured upon and rises from the cover 5 of the holder and has a closed top at 57. Where the branch pipes are used, as in Figs. 1 and 6, they are so located as to be within and protected by the dome 56, and the pipe 13 is slidably guided through the top 57 of the dome by means of a suitable stuffing box, as indicated at 58. Where the pipes 13 and 15 operate directly into the containers or tanks 3 of the milk holder, without the use of branch pipes, the pipes 13 and 15 are both slidable in stuffing boxes 58 on the top of the dome. By the means described no portion of the supply and discharge pipes that enter the milk will come in contact with external atmosphere or germs that may be floating therein. Steam or hot air from chamber 6 will pass over the top of holder 1 into containers 3, (Fig. 8), and into dome 56, thus heating the interior of the dome to a temperature hotter than the milk in the holder.

In accordance with the constructions set forth the advantageous features hereinbefore referred to may be carried out for the pasteurization of milk in a continuous manner. An advantage is that there is no chance for dripping of milk that is unpasteurized into milk that is to be or has been pasteurized, as there are no valves to be operated to control the supply or discharge in such a position that contamination of the milk pasteurized or to be pasteurized can occur, it being noted that the fresh milk flowing through the supply pipe 13 can never come in contact with other milk that has been treated in the milk holder. It also will be noted that there is no external air to be carried by or with the inflowing milk into the holder, and the milk is deposited in the holder at the bottom thereof so that foaming of the milk is prevented, and thereby the advantage is attained of preventing improper pasteurization of the milk due to foam. It will be noted that an advantage of my invention is that the containers or tanks 3 are charged with milk and discharged through their tops by means of the pipes inserted in and removed therefrom through said tops without requiring or having any supply or discharge pipes leading through the side walls or the bottom of the holder, whereby contamination of pasteurized milk by unpasteurized milk through leakage is prevented. The advantage of having the supply and discharge pipes within the dome that is internally heated by steam or hot air is that milk that adheres to said pipes within the dome will be pasteurized by said steam or hot air.

Having now described my invention what I claim is:—

1. A milk pasteurizing apparatus comprising a series of containers having open top portions, means separate from the containers to charge the latter, and means of sufficient length to enter the containers to discharge the containers through their upper open portions.

2. A milk pasteurizing apparatus as set forth in claim 1, provided with a dome over the containers enclosing the means to charge and discharge the same.

3. A milk pasteurizing apparatus comprising a series of containers having open top portions, means separate from the containers to charge and discharge the containers through their upper open portions, and a dome over the containers enclosing the means to charge and discharge the same so as to effectively protect said means from contamination from without.

4. A pasteurizing apparatus comprising a series of containers, means separate from the containers to charge the same, means separate from the containers to discharge the same, and devices to cause said discharge means to enter and recede from separate containers in the series.

5. A milk pasteurizing apparatus comprising a series of spaced containers having open top portions, a milk supply pipe and a discharge pipe adapted to enter the open top portions of the containers, means to cause the pipes to enter and recede from the containers, and means for moving the pipes and the containers relatively to one another for successively positioning the pipes over containers.

6. A pasteurizing apparatus comprising a series of containers, single milk supply means separate from the containers, single discharge means for the pasteurized milk separate from the containers, devices to cause said discharge means to enter and recede from separate containers, and means to move said supply and discharge means and said containers relatively one to another for successively positioning them for charging and discharging the containers.

7. A pasteurizing apparatus comprising a series of containers, a supply pipe separate from the containers to enter the latter successively, a discharge pipe separate from the containers to successively enter containers, means spacing said pipes corresponding to the containers to enter different containers, means to cause the pipes to enter and recede from the containers, and means to move the pipes and the containers relatively one to another for successively positioning the pipes over adjacent containers.

8. A milk pasteurizing apparatus comprising a series of containers, a milk supply pipe and a discharge pipe, and means to insert said pipes into and remove them successively from different containers at determined periods.

9. A milk pasteurizing apparatus as set forth in claim 8, provided with means to simultaneously charge one container and discharge another container.

10. A milk pasteurizing apparatus comprising a series of containers having open top portions, a milk supply pipe and a discharge pipe spaced to enter separate containers, means to lower the pipes into said containers in positions adjacent to the bottoms of the containers to charge milk into and discharge pasteurized milk from the bottom portions of the containers through said open top portions, and means to cause relative movement between the containers and the pipes for successive charging and discharging of the containers.

11. A milk pasteurizing apparatus as set forth in claim 10, provided with a dome enclosing the portions of the pipes that enter the containers.

12. A milk pasteuring apparatus comprising a series of containers, a pair of pipes spaced to enter some of the containers simultaneously, said pipes having no communication between them, means to advance the pipes into spaced containers for charging one container and discharging another and for removing the pipes from the containers, and means for moving the pipes and the containers relatively to one another for positioning the pipes over containers.

13. A milk pasteurizing apparatus comprising a series of containers, a supply pipe for milk and a discharge pipe for pasteurized milk spaced apart in position to be within spaced containers simultaneously, and means to enter said pipes into the spaced containers, to cause charging of an empty container and discharging of a charged container simultaneously.

14. A milk pasteurizing apparatus comprising a series of spaced containers, a supply pipe and a discharge pipe connected together and having no communication with one another adapted to enter separate containers simultaneously, means to simultaneously move said pipes into and from the containers, and means for moving said pipes and said containers relatively one to another for successively positioning the pipes over the containers.

15. A milk pasteurizing apparatus as set forth in claim 14, provided with a dome enclosing the portions of the pipes that enter the containers.

16. A milk pasteurizing apparatus comprising a series of containers, a supply pipe and a discharge pipe spaced apart to enter different containers and having no communication therebetween, a cylinder communicating with and connected to the supply pipe and having a float valve at the point of communication, and a pipe to deliver milk into the cylinder, the supply pipe having a valve at its outlet end to be closed by the weight of milk in the pipe, the discharge pipe having a valve at its milk receiving end to be closed by the weight of milk in the pipe, said pipe having a portion above the containers and a portion below the containers for siphoning milk therefrom.

17. A milk pasteurizing apparatus comprising a series of containers, a supply pipe and a discharge pipe spaced apart to enter different containers and having no communication therebetween, a cylinder communicating with and connected to the supply pipe and having a float valve at the point of communication, and a pipe to deliver milk into the cylinder, the supply pipe having a valve at its outlet end to be closed by the weight of milk in the pipe, the discharge pipe having a valve at its milk receiving end to be closed by the weight of milk in the pipe, said pipe having a portion above the containers and a portion below the containers for siphoning milk therefrom, a cylinder receiving the lower end of the outlet pipe and having a discharge outlet and a float valve controlling said outlet, the cylinders being spaced so that when the supply pipe is out of the container the outlet end of the third named pipe will be near the bottom of the first named cylinder and the outlet end of the discharge pipe will be near the top of the second named cylinder.

18. A milk pasteurizing apparatus comprising a milk holder including a series of spaced containers and having an axial chamber, a milk supply pipe and a discharge pipe axially disposed with respect to said chamber, the supply pipe having a branch and the outlet pipe having a branch, the branches being spaced and adapted to enter different containers, means connecting the delivery and outlet pipes without communication therebetween, means to raise and lower said pipes, means to rotate said pipes when raised from the containers for causing the branch pipes to enter the containers successively, and means to cause milk to flow through the supply pipe into the containers and through the discharge pipe from the containers.

19. A milk pasteurizing apparatus as set forth in claim 18, in which the discharge end of the supply pipe and the milk receiving end of the outlet pipe are provided with valves to retain milk in the pipes when the latter are raised from the milk-flowing position in the containers.

20. A milk pasteurizing apparatus comprising a series of spaced containers having open top portions, a supply pipe and a discharge pipe adapted to enter the open top portions of the containers, means to cause the pipes to enter and recede from the containers, means for moving said pipes and said containers relatively one to another for successively positioning the pipes over containers, a pump to supply milk through the supply pipe, a pump to discharge milk through the discharge pipe, means to operate said pumps, and means to cause starting of both pumps when the supply and discharge pipes have reached the supply and discharge positions in their respective containers and to stop the pumps when the supply and discharge pipes are out of their respective containers.

21. A milk pasteurizing apparatus as set forth in claim 20, provided with a dome enclosing portions of the pipes that enter the containers.

22. A milk pasteurizing apparatus comprising a series of spaced containers having open top portions, a supply pipe and a discharge pipe adapted to enter the open top portions of the containers, means to cause the pipes to enter and recede from the containers, and means to rotate the pipes relatively to said containers.

23. A milk pasteurizing apparatus comprising a series of spaced containers having open top portions, a supply pipe and a discharge pipe adapted to enter the open top portions of the containers, means to cause the pipes to enter and recede from the containers, means to rotate the pipes relatively to said containers, a pump to supply milk through the supply pipe, a pump to discharge milk through the discharge pipe, means to operate said pumps, and means to cause starting of both pumps when the supply and discharge pipes have reached the supply and discharge positions in their respective containers and to stop the pumps when the supply and discharge pipes are out of their respective containers.

24. A milk pasteurizing apparatus comprising a series of spaced containers having open top portions, a supply pipe and a discharge pipe adapted to enter the open top portions of the containers, means to cause the pipes to enter and recede from the containers, means to move said pipes and the containers relatively one to another, a pump to supply milk through the supply pipe, a pump to discharge milk through the discharge pipe, means to operate said pumps, and means to cause starting of both pumps when the supply and discharge pipes have reached the supply and discharge positions in their respective containers and to stop the pumps when the supply and discharge pipes are out of their respective containers.

25. A milk pasteurizing apparatus comprising a series of chambers, a milk supply pipe and a discharge pipe, and means to insert said pipes into and remove them successively from different chambers at predetermined periods.

26. A milk pasteurizing apparatus comprising a series of chambers, a supply pipe for milk and a discharge pipe for pasteurized milk spaced apart in position to be within spaced chambers simultaneously and means to enter said pipes into the spaced chambers, to cause charging of an empty chamber and discharging of a charged chamber simultaneously.

27. In a pasteurizing apparatus, a plurality of holding chambers, and mechanically operated tubular arms successively movable into and out of the heated areas of pairs of said chambers for filling one of the pair of chambers and emptying the other chamber.

28. In a pasteurizing apparatus, a plurality of holding chambers, a chamber-emptying member, a chamber-filling member, said members being jointly operable, means for revolving said members with respect to the chambers, and means for lowering and raising said members into and out of the heated areas of a pair of said chambers well within said chambers.

29. In a pasteurizing apparatus, a plurality of holding chambers, a chamber emptying member, a chamber filling member, said members being jointly operable, means for intermittently turning said members from a position over one pair of chambers to an advanced position over another chamber and one of the chambers in the last pair, and means for lowering and raising said members into and out of the inner heated areas of a pair of chambers between intermittent turning movements.

30. In a pasteurizing apparatus, a central member, means for turning said central member, means for moving said central member vertically, a plurality of holding chambers grouped about said central member, a chamber filling arm carried by said central member and extending laterally therefrom, and a chamber emptying arm carried by said central member and extending laterally therefrom and angularly separated from said chamber filling arm, said arms having open outer end portions and being adapted to simultaneously enter and operate on adjacent chambers with the outer end portions entirely within the body portions of said chambers.

31. In a pasteurizing apparatus, a central member, means for intermittently turning said central member, means for moving said central member vertically between intermittent turning movements, a plurality of stationary holding chambers grouped about said central member, a valve controlled chamber filling arm carried by said central member and extending laterally therefrom, and a valve controlled chamber emptying arm carried by said central member and extending laterally therefrom and angularly separated from said chamber filling arm, said arms, when in a lowered position, making an interior operative connection with a pair of adjacent chambers.

32. In a pasteurizing apparatus, an elongated tubular central member having a discharge passageway therethrough, means for intermittently turning said central member, means for moving said central member vertically between intermittent turning movements, a supply chamber mounted at the upper end portion of said central member, a plurality of stationary holding chambers grouped about said central member, a tubular valve controlled chamber filling arm carried by said central member and connected with said supply chamber, and a tubular valve controlled chamber emptying arm also carried by said central member and in connection with said discharge passageway and disposed at an angle with respect to the filling arm, said arms when in a lowered position making an interior operative connection with a pair of adjacent chambers.

33. In a pasteurizing apparatus, a series of jacketed holding chambers, tubes for filling and emptying the chambers, and mechanical means for intermittently inserting said tubes into pairs of the chambers and making operative interior connections directly with the lower portions of said chambers in a predetermined time and sequence.

34. In a pasturizing apparatus, a series of jacketed liquid holding chambers, simultaneously operating tubes for filling and emptying a pair of said chambers, mechanical means for intermittently inserting said tubes into pairs of chambers in a predetermined time and sequence, and means for introducing heated air directly into a chamber being emptied of its liquid.

35. In a pasteurizing apparatus, a plurality of holding tanks, a tank emptying member, a tank filling member, said members being jointly operable, means for intermittently revolving said members with respect to the tanks, and means for lowering and raising said members deeply into and out of a pair of tanks between intermittently revoluble movements.

36. In a pasteurizing apparatus, a plurality of insulated holding tanks, a tank emptying member, a tank filling member, said members being jointly operable, means for intermittently revolving said members with respect to the tanks, means for lowering and raising said members into and out of a pair of tanks between intermittent revoluble movements, and means for supplying a warm atmosphere to said tanks.

37. In a pasteurizing apparatus, a plurality of insulated holding tanks, a tank emptying member, a tank filling member, said members being jointly operable, means for intermittently revolving said members with respect to the tanks, means for lowering and raising said members into and out of a pair of tanks between intermittent revoluble movements, and means forming a common enclosure for said tanks whereby the atmosphere in a tank that is being filled may be transferred to a tank that is being emptied.

38. In a pasteurizing apparatus, a plurality of liquid holding tanks, mechanically operated tubular arms successively movable into and out of pairs of said tanks for filling one of a pair of tanks and emptying the other tank, and means for accommodating a transfer of atmosphere from the tank being filled to the tank being emptied.

CHARLES E. NORTH.